Nov. 25, 1969  G. ROMI  3,479,899
MECHANISM FOR REGULATING THE OPERATION OF TRANSMISSIONS OR THE LIKE
Filed Feb. 7, 1967  4 Sheets-Sheet 4

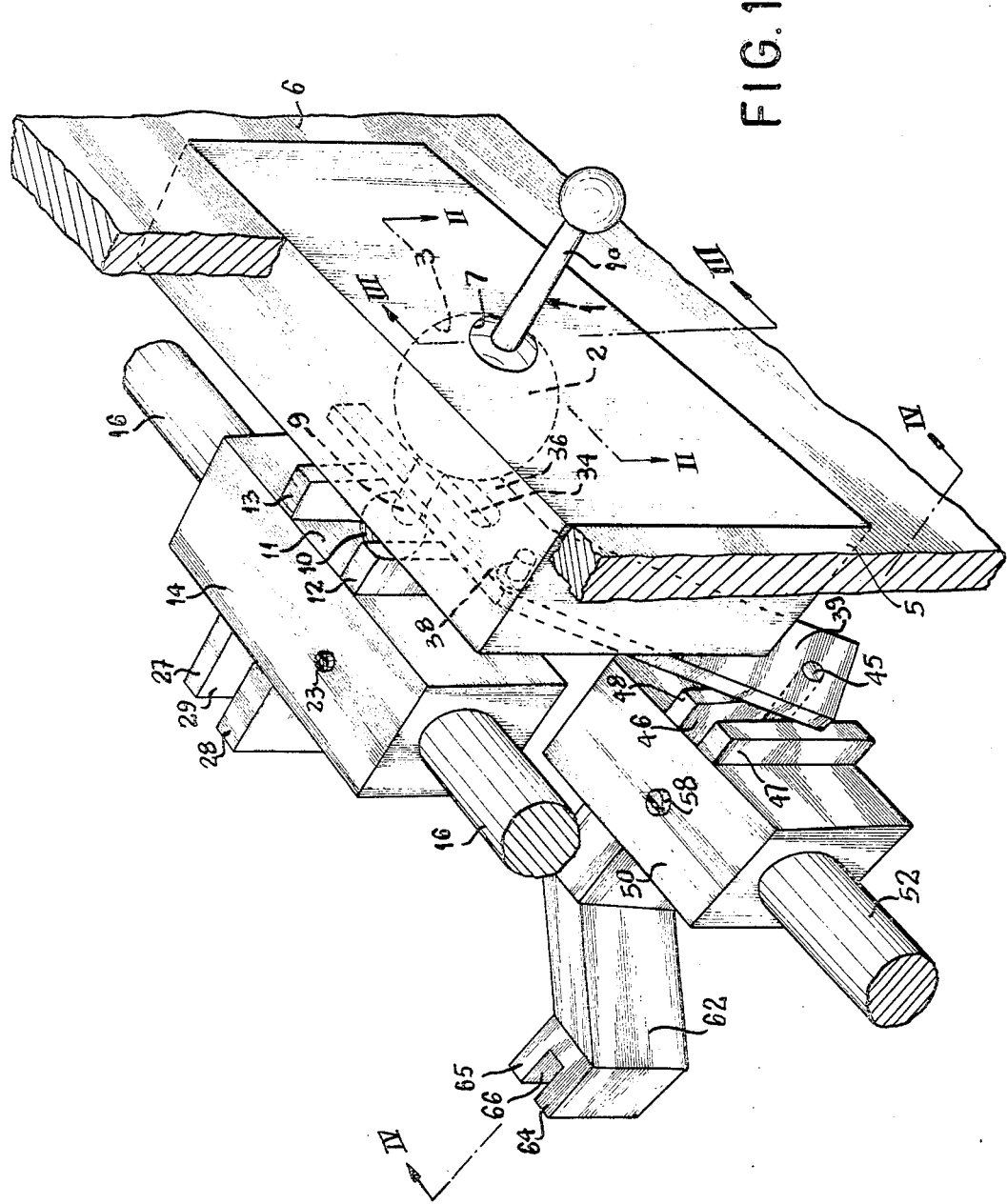

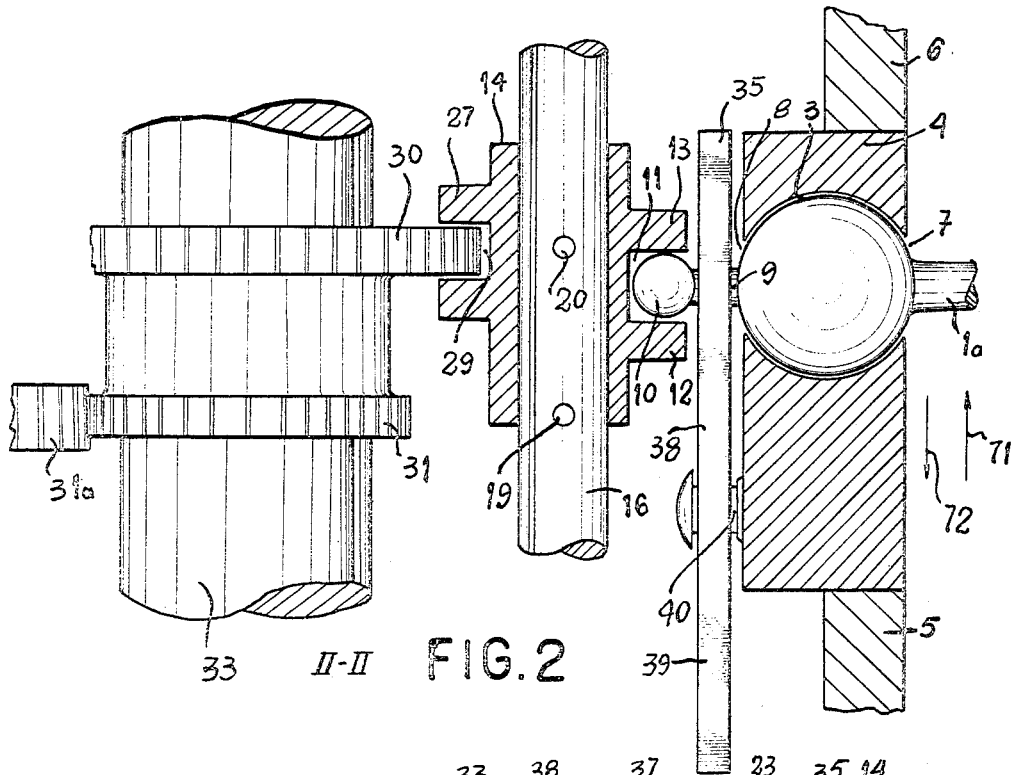
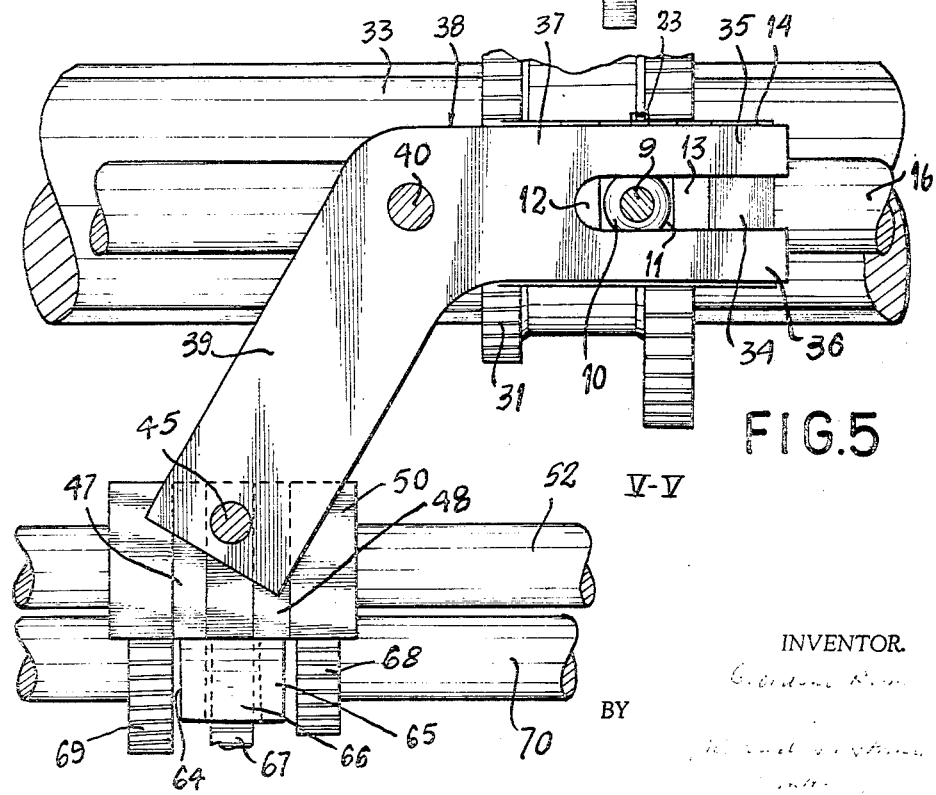

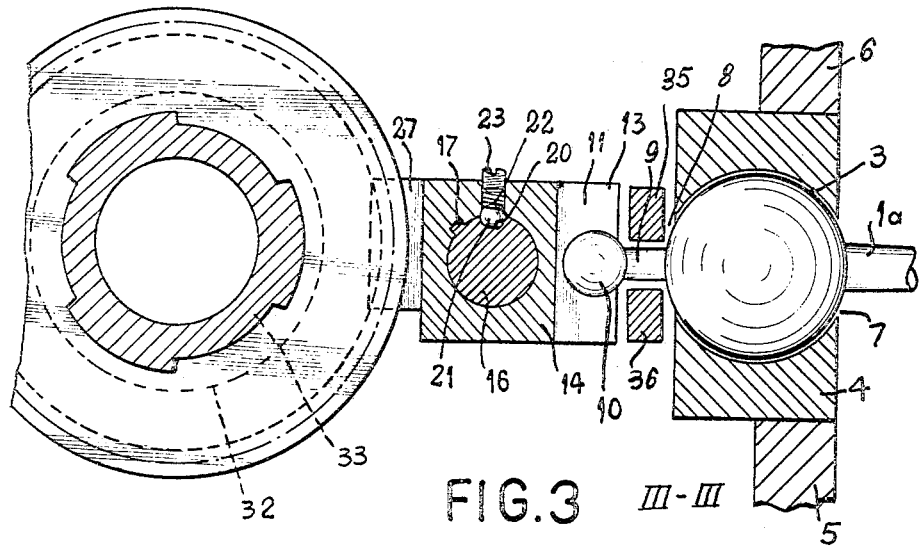
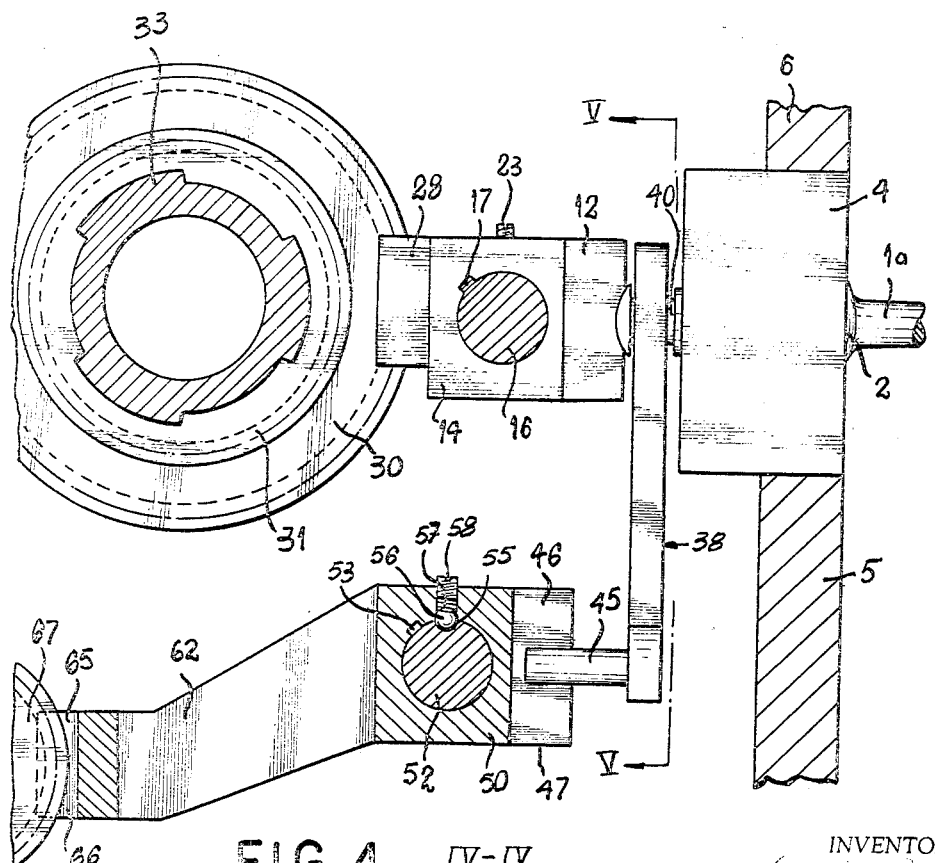

INVENTOR.

United States Patent Office 3,479,899
Patented Nov. 25, 1969

3,479,899
MECHANISM FOR REGULATING THE OPERATION
OF TRANSMISSIONS OR THE LIKE
Giordano Romi, Sao Paulo, Brazil, assignor to Industrias
Romi S.A., Sao Paulo, Brazil
Filed Feb. 7, 1967, Ser. No. 614,456
Int. Cl. G05g 9/02
U.S. Cl. 74—473                                    17 Claims

ABSTRACT OF THE DISCLOSURE

A shifting mechanism for variable speed transmissions comprises a single selector lever which is movable between several positions to have during such movement a component of movement in the one and/or the other of two mutually inclined directions. The selector lever is directly coupled with two shifters one of which is displaced only when the lever has a component of movement in one direction and the other of which is displaced only when the lever has a component of movement in the other direction. Both shifters are displaced when the lever is moved in a sense to have components of movement in both directions.

---

The present invention relates to a mechanism which can be utilized to regulate the operation of variable-speed transmissions or the like. More particularly, the invention relates to improvements in a mechanism which is capable of placing a transmission or an analogous adjustable apparatus into any one of several positions, for example, to change the speed ratio of a transmission which is used in a machine tool, an automotive vehicle or any other contrivance that must be operated at different speeds.

It is an important object of my invention to provide a novel and improved mechanism which can be used to carry out a finite or infinite number of adjustments in the position or condition of a selective variable-speed transmission or the like, for example, to change the speed ratio of a transmission in a machine tool or in an automotive vehicle.

Another object of the invention is to provide a mechanism which can change the ratio of a variable-speed transmission in any desired sequence or in accordance with a preselected program without going through intermediate stages and wherein all movements necessary for speed changes can be derived from the movement of a single actuator or selector.

A further object of the invention is to provide a mechanism of the just outlined character wherein the transmission need not be placed into neutral position if the operator wishes to change the speed ratio.

An additional object of the invention is to provide a very simple, compact, rugged, and easy-to-manipulate mechanism which can be readily installed in many presently known machine tools and/or other apparatus whose conditions or position must be changed in order that they may carry out their intended functions.

Still another object of the invention is to provide a mechanism which can change the speed ratio of a transmission with gradual or sudden transition between a higher and a lower speed.

A concomitant object of the invention is to provide a mechanism which can be manipulated directly by hand, by remote control, or by a programming unit.

An additional object of the invention is to provide a mechanism which comprises a small number of parts and which can carry out a finite or infinite number of adjustments.

Another object of the instant invention is to provide a mechanism which can be adjusted in a very simple and convenient way to change the range of speed ratios in a variable-speed transmission or the like.

A further object of the invention is to provide a mechanism which can be placed in direct or indirect motion transmitting engagement with the shifting elements of a variable-speed transmission.

Briefly outlined, one feature of the invention resides in the provision of a mechanism for regulating the operation of variable-speed transmissions or the like, comprising a selector arranged to travel between a plurality of positions and having, during travel between said positions, a component of movement in at least one of two mutually inclined directions, first motion receiving means coupled with and displaceable by the selector in response to travel in the course of which the selector has a component of movement in one of such directions, and second motion receiving means coupled with and displaceable by the selector in response to travel in the course of which the selector has a component of movement in the other direction. The first and second motion receiving means will be displaced simultaneously in response to travel in the course of which the selector has components of movement in both directions.

The mechanism further comprises mounting means for the selector. In accordance with a presently preferred embodiment of the invention, the selector and its mounting means comprise cooperating portions which constitute a universal joint for the selector.

The novel features which are considered as characteristic of the invention are set forth in particular in the appended claims. The improved regulating mechanism itself, however, both as to its construction and its mode of operation, together with additional features and advantages thereof, will be best understood upon perusal of the following detailed description of certain specific embodiments with reference to the accompanying drawings, in which:

FIG. 1 is a somewhat schematic perspective view of a regulating mechanism which embodies one form of the present invention;

FIG. 2 is a horizontal section as seen in the direction of arrows from the line II—II of FIG. 1;

FIG. 3 is a vertical section as seen in the direction of arrows from the line III—III of FIG. 1;

FIG. 4 is a vertical section as seen in the direction of arrows from the line IV—IV of FIG. 1;

FIG. 5 is a section as seen in the direction of arrows from the line V—V of FIG. 4;

Figure 6:
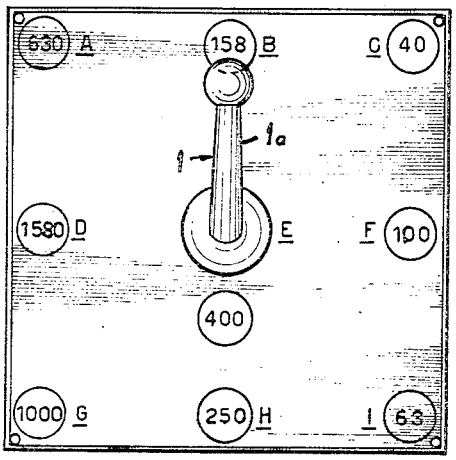
FIG. 6 is a front elevational view of the mounting means for the selector of a regulating mechanism which is similar to the one shown in FIGS. 1–5.

Referring first to FIGS. 1 to 5, there is shown a mechanism which can be utilized in a machine tool to regulate the operation of a variable-speed transmission, for example, to change the speed ratio of a variable-speed transmission utilized to drive a work spindle or a tool spindle within a predetermined range of speeds. Such transmission can be installed in the headstock of a lathe whose spindle must be driven at six different speeds. The mechanism comprises mounting means including walls 5, 6 connected with a bearing member 4 having a central portion provided with a spherical socket 3 which accommodates the ball fulcrum 2 of an actuating member or selector 1. The ball fulcrum 2 and the central portion of the bearing member 4 constitute a universal joint which enables the selector 1 to move between an infinite number of positions each of which or some of which can correspond to a different speed ratio of the transmission. The selector 1 has a manually operable stem or arm 1a which extends with clearance through a preferably (but not necessarily) circular opening 7 of the bearing member 4, the diameter of the opening 7 being large enough to allow for unimpeded pivotal movements of the selector between the positions A–J shown in FIG. 6.

The hearing member 4 has a second preferably circular opening 8 located opposite the opening 7 and receiving with clearance a motion transmitting extension or pin 9 of the selector 1. The free end of the pin 9 is provided with a spherical head 10.

The mechanism of FIGS. 1 to 5 further includes first and second motion receiving means which are displaceable independently of as well as together with each other, depending on the direction of movement of the selector 1. The first motion receiving means comprises a sleeve-like shifter 14 which is reciprocable in a horizontal direction and is slidably telescoped onto a horizontal guide rod 16. The shifter 14 has two vertical slots 11, 29 disposed at the opposite sides of the guide rod 16 and respectively bounded by flanges or wings 12, 13 and 27, 28. The slot 11 receives the head 10 of the pin 9 and the flange 12 or 13 will displace the entire shifter 14 along the guide rod 16 when the travel of the selector 1 has a component of movement in a horizontal direction (see the arrows 71 and 72 in FIG. 2). The shifter 14 will be displaced in the direction of arrow 72 if the arm 1a is pivoted in the direction indicated by arrow 71, and vice versa. It will be seen that the shifter 14 is coupled to the selector 1 by a pin-and-slot connection (9, 11) which will displace the shifter 14 only when the travel of the selector has a horizontal component of movement (arrow 71 or 72), irrespective of the starting position of the selector, i.e., regardless of whether the selector 1 moves to or from any of the positions A–J shown in FIG. 6. During travel from position B (actually shown in FIG. 6) to position A or C, the selector 1 will have only a horizontal component of movement. Travel from B to E or H will have only a vertical component of movement (i.e., the position of the shifter 14 with reference to the guide rod 16 will remain unchanged), and travel from B to D, F, G or J will have vertical and horizontal components of movement (i.e., the shifter 14 will be displaced along the guide rod 16).

The slot 29 of the shifter 14 receives a portion of a spur gear 30 forming part of a gear cluster which further includes a smaller-diameter gear 31 connected with the gear 30 by a sleeve 32. The gear 31 is shown in mesh with a driven gear 31a mounted on a driven shaft (not shown) which can drive the work spindle or the tool spindle of a machine tool at different speeds. The sleeve 32 is slidable on a splined driver shaft 33. By moving the shifter 14 along the guide rod 16, the selector 1 can move the gear 30 into mesh with another gear on the shaft of the gear 31a to thereby change the speed of the spindle. In the embodiment of FIGS. 1–5, the cluster on the shaft 33 comprises only two gears 30, 31 but the number of such gears can be increased or reduced. The elements 30–33 form part of a variable-speed transmission.

FIG. 3 shows an axially parallel spline 17 provided on the guide rod 16 and extending into a groove of the shifter 14 to hold the latter against angular movement. The first motion receiving means is further provided with detent means for yieldably holding the shifter 14 in two end positions. Such detent means comprises two shallow concave recesses 19, 20 provided in the periphery of the guide rod 16 and a ball 21 received in a tapped bore of the shifter 14. The ball 21 is biased by a helical spring 22 whose bias is adjustable by a screw 23. When the shifter 14 assumes one of its end positions, the ball 21 snaps into the recess 19 or 20.

The second motion receiving means of the regulating mechanism shown in FIGS. 1 to 5 comprises a bell crank lever 38 which is rockable on a pivot pin 40 mounted on the bearing member 4. The arm 37 of the lever 38 is provided with an elongated slot 34 bounded by two legs 35, 36 which straddle the pin 9 between the head 10 and ball 2. The other arm 39 of the lever 38 has a horizontal motion transmitting post 45 which extends into a vertical slot 46 between the flanges or wings 47, 48 of a second shifter 50. This shifter is reciprocable along a guide rod 52 and has an axially parallel groove for a spline 53 of the guide rod. A detent including three concave recesses 55 (only one shown in FIG. 4) machined into the periphery of the guide rod 52 and a ball 56 in a tapped bore of the shifter 50 can yieldably hold the shifter in three different positions. The ball 56 is biased by a spring 57 whose bias is adjustable by a screw 58.

The shifter 50 has an arm 62 provided with two flanges or wings 64, 45 bounding a vertical slot 66 which receives a portion of a spur gear 67. This gear constitutes the central element of a gear cluster further including gears 68, 69 and being slidable on a shaft 70 serving to transmit torque to the shaft 33 in a manner not shown in the drawings, for example, through a set of constantly meshing gears. Each of the gears 67–69 can be placed into mesh with a set of driver gears (not shown) on an output shaft which can be driven at constant speed by an electric motor or another prime mover serving to drive the transmission. By changing the angular position of the lever 38 in response to such travel of the selector 1 which has a component of movement in vertical direction, the operator will shift the gears 67–69 along the shaft 70 to select one of three speeds for the shaft 33. The gears 67–69 are compelled to rotate with the shaft 70. If the travel of the selector 1 has a vertical and a horizontal component of movement, the angular position of the lever 38 will change simultaneously with a change in the position of shifter 14 relative to guide rod 16. This enables the transmission to provide six different speed ratios, depending upon whether the shaft 33 is driven by the gear 67, 68, 69 and whether the shaft 33 transmits torque through the gear 30 or 31.

Figure 7:
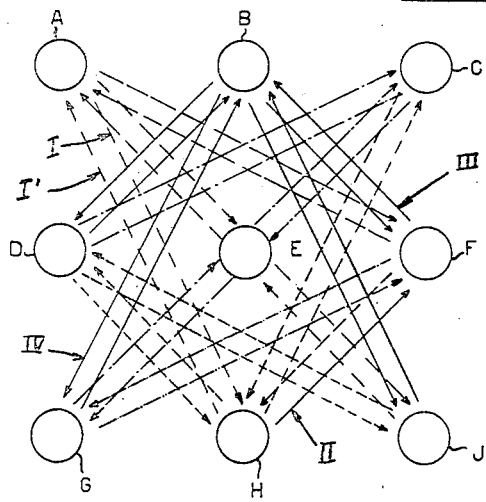
FIG. 7 is a diagram indicating various positions of the selector and several possible paths of movement of selector between such positions.
Figure 8:
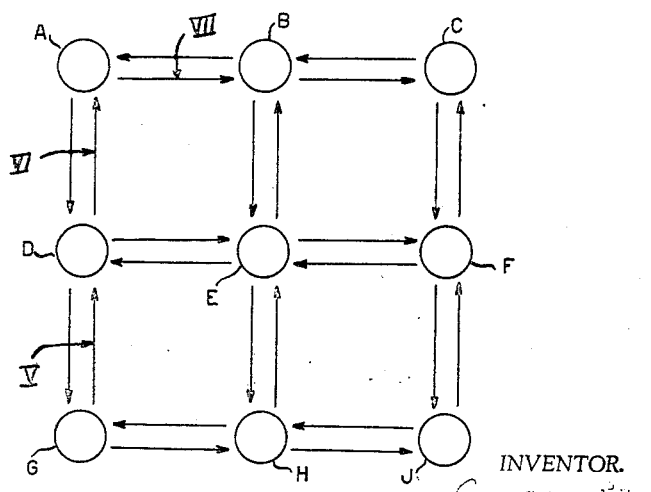
FIG. 8 is a similar diagram but showing additional paths of movement of the selector between its positions.

The versatility of the improved regulating mechanism will be more readily understood with reference to FIGS. 6 to 8. FIG. 6 illustrates, by way of example, that the selector 1 can cause a driven element (such as a spindle in a machine tool) to rotate at a plurality of different speeds including 40, 63, 100, 158, 250, 400, 630, 1,000 and 1,580 r.p.m. each of which is identified by a suitable plate or an analogous marker.

It is now assumed that the sleeve 32 on the shaft 33 carries a cluster of three spur gears so that the transmission can be operated at nine speeds each corresponding to one of the positions A–J. As actually shown in FIGS. 1–5, the mechanism will enable the transmission to operate at six speeds because the sleeve 32 has only two gears 30, 31.

FIGS. 7 and 8 show that the spherical head of the arm 1a can be shifted radially from the central position E to and from the outer positions A–D, F–J and also between any two outer positions without necessarily passing through the central position. In FIG. 7, the lines I, II, III, IV, etc. indicate various paths of movement of the selector arm 1a in such a way that each such path extends along the hypotenuse of a triangle whose corners are constituted by the positions A–J. These positions correspond to nine ratios of the transmission in which the gears are in full mesh so that the spindle is driven at one of the speeds indicated in FIG. 6. The number of speed ratios will be increased to twelve if the shafts 70 and 33 respectively carry four and three or three and four or six and two or two and six gears.

If the head of the arm 1a is moved from the position A to the position H, it will travel along the line I which is the hypotenuse of triangle A, D, H or A, G, H. This will reduce the speed from 630 to 250 r.p.m. Movement of the arm 1a in opposite direction (line I′) will increased the speed from 250 to 630 r.p.m. In order to reduce the speed to 100 r.p.m., the operator will move the head of the stem 1a from the position H to the position F along a line II which is the hypotenuse of the triangle E, F, H or F, H, J. From the position F, the head of the arm 1a can be moved to position B (158 r.p.m.) along a line III which is the hypotenuse of the triangle B, C, F or B, E, F. The line IV is a hypotenuse of the triangle A, B, G or B, D, G or B, E, G or B, G, H and indicates movement of the arm 1a to position G corresponding to a speed of 1,000 r.p.m. All of the above described movements along lines I, I', II, III and IV will have horizontal and vertical components so that the shifter 14 will be displaced simultaneously with shifter 50.

FIG. 8 shows that the head of the arm 1a can be moved along lines V, VI, VII, etc. which constitute the cathetes of triangles whose corners are located in points indicating the positions A–J. By moving along the line V, the arm 1a will displace the lever 38 and shifts 50 but the position of the shifter 14 will remain unchanged or will change too little to move one of the gears on the sleeve 32 out of mesh with the corresponding gear on the shaft of the gear 31a. The speed will be changed from 1,000 to 1,580 r.p.m. Line V is one side of a triangle D, E, G or D, G, H. In order to change the speed to 630 r.p.m., the head of the arm 1a will be moved along the line VI to the position A whereby the position of the shifter 14 remains unchanged or is changed too little to effect a speed change through the gears on the sleeve 32. Movement of the arm 1a to position B (line VII) will reduce the speed to 158 r.p.m. Such movement will cause displacement of the shifter 14. The lever 38 can pivot slightly when the arm 1a moves from A to B, but such pivotal movement is not sufficient to disengage one of the gears 67–69 from the associated gear on the output shaft.

It will be seen that the position E shown in FIGS. 6–8 is an active or operative position of the selector 1 in which the transmission continues to receive torque. Of course, the transmission can be placed in neutral while the head of the arm 1a assumes one or more intermediate positions in which the gears 67–69 and the gears of the sleeve 32 are moved out of mesh with the associated gears. However, even when the transmission is in neutral, the selector 1 remains coupled to the shifters 14 and 50. Each neutral position can be indicated by a symbol on the exposed surface of the bearing member 4. When the transmission is in neutral, the spindle or spindles can be rotated by hand.

A true picture of the versatility of my regulating mechanism will be obtained by superimposing FIG. 7 on FIG. 8, or vice versa. Such superimposition will indicate that, starting from the central position E, the operator can change the speed from 400 to 158, 40, 100, 63, 250, 1,000, 1,580 or 630 r.p.m. in any desired sequence. When starting from the position A, the speed may be changed from 63 to any of the other eight speeds, and so forth, whereby the change to 400, 158, 100, 250 or 1,580 r.p.m. can be made directly and the change to 40, 63 or 1,000 r.p.m. indirectly (via position B, E, or D). Thus, the transmission controlled by my regulating mechanism is a selective variable-speed transmission because it can be shifted from low to high or vice versa without going through intermediate speeds and/or neutral.

It is clear that such components of movement of the selector 1 which cause displacement of the motion receiving shifters 14 and 50 need not make an angle of 90 degrees as long as the directions of such components are inclined with reference to each other. Moreover, the universal joint 2, 4, is but one of the many means which may be resorted to in mounting the selector for movement between a plurality of positions.

Without further analysis, the foregoing will so fully reveal the gist of the present invention that others can, by applying current knowledge, readily adapt it for various applications without omitting features which fairly constitute essential characteristics of the generics and specific aspects of my contribution to the art and, therefore, such adaptations should and are intended to be comprehended within the meaning and range of equivalence of the following claims.

What is claimed as new and desired to be protected by Letters Patent is:

1. Mechanism for regulating the operation of variable-speed transmissions or the like, comprising a selector arranged to travel between a plurality of positions and having, during travel between such positions, a component of movement in at least one of two mutually inclined directions; first motion receiving means coupled with and displaceable by said selector only in response to travel in the course of which said selector has a component of movement in one of said directions; second motion receiving means coupled with and displaceable by said selector only in response to travel in the course of which said selector has a component of movement in the other direction, said first and second motion receiving means being displaced simultaneously in response to travel in the course of which said selector has components of movement in both said directions; guide means for each of said motion receiving means; and detent means provided on each of said motion receiving means and on the respective guide means to yieldably hold said motion receiving means in predetermined positions.

2. Mechanism as defined in claim 1, further comprising mounting means for said selector, said selector and said mounting means comprising cooperating portions defining a universal joint for said selector.

3. Mechanism as defined in claim 1, further comprising first and second coupling means respectively connecting said selector with said first and second motion receiving means, each of said coupling means being constituted by a pin-and-slot connection.

4. Mechanism for regulating the operation of selective transmissions as defined in claim 1, wherein each of said motion receiving means is arranged to shift a gear cluster of the transmission.

5. Mechanism as defined in claim 1, wherein said directions make an angle of substantially 90 degrees.

6. Mechanism as defined in claim 1, wherein said selector is arranged to travel to and from a central position at the intersection of said directions.

7. Mechanism as defined in claim 1, further comprising mounting means for said selector, said mounting means being provided with markers indicating at least some positions of said selector.

8. Mechanism as defined in claim 7, wherein said selector is fulcrumed in said mounting means and is pivotable between a central position and a plurality of outer positions as well as directly between such outer positions.

9. The combination of a selective variable-speed transmission having a pair of movable gear means with a mechanism for changing the speed ratio of said transmission, said mechanism comprising a selector arranged to travel between a plurality of positions each corresponding to a different speed ratio of said transmission and having during travel between such positions a component of movement in at least one of two mutually inclined directions, first motion receiving means coupled with and displaceable by said selector only in response to travel in the course of which said selector has a component of movement in one of said directions, and second motion receiving means coupled with and displaceable by said selector only in response to travel in the course of which said selector has a component of movement in the other of said directions, said first and second motion receiving means being displaced simultaneously only in response to travel in the course of which said selector has components of movement in both said directions and each of said motion receiving means comprising a portion which moves one of said gear means in response to displacement of the respective motion receiving means.

10. The combination of claim 9, wherein said motion receiving means remain coupled with said selector in each said position.

11. The combination of claim 10, wherein each of said gear means comprises a cluster of gears.

12. The combination of claim 10, wherein the axes of said gear means are parallel.

13. The combination of claim 10, wherein said selector is movable between at least six positions.

14. The combination of claim 10, wherein said selector comprises a manually operable portion.

15. Mechanism for regulating the operation of variable-speed transmissions or the like, comprising a selector arranged to travel between a plurality of positions and having, during travel between such positions, a component of movement in at least one of two mutually inclined directions; first motion receiving means coupled with and displaceable by said selector only in response to travel in the course of which said selector has a component of movement in one of said directions, said first motion receiving means comprising a shifter reciprocable in said one direction; and second motion receiving means coupled with and displaceable by said selector only in response to travel in the course of which said selector has a component of movement in the other direction, said first and second motion receiving means being displaced simultaneously in response to travel in the course of which said selector has components of movement in both said directions.

16. Mechanism for regulating the operation of variable-speed transmissions or the like, comprising a selector arranged to travel between a plurality of positions and having, during travel between such positions, a component of movement in at least one of two mutually inclined directions; first motion receiving means coupled with and displaceable by said selector only in response to travel in the course of which said selector has a component of movement in one of said directions; and second motion receiving means coupled with and displaceable by said selector only in response to travel in the course of which said selector has a component of movement in the other direction, said first and second motion receiving means being displaced simultaneously in response to travel in the course of which said selector has components of movement in both said directions, said second motion receiving means comprising a lever rockable about a fixed pivot axis.

17. Mechanism for regulating the operation of variable-speed transmissions or the like, comprising a selector arranged to travel between a plurality of positions and having, during travel between such positions, a component of movement in at least one of two mutually inclined directions; first motion receiving means coupled with and displaceable by said selector only in response to travel in the course of which said selector has a component of movement in one of said directions; and second motion receiving means coupled with and displaceable by said selector only in response to travel in the course of which said selector has a component of movement in the other direction, said first and second motion receiving means being displaced simultaneously in response to travel in the course of which said selector has components of movement in both said directions, each of said motion receiving means comprising a reciprocable shifter at least one of which is directly coupled with said selector.

References Cited
UNITED STATES PATENTS

| | | | |
|---|---|---|---|
| 2,209,469 | 7/1940 | Nenninger et al. | 74—473 XR |
| 2,332,381 | 10/1943 | Hoelscher | 74—473 XR |
| 2,547,317 | 4/1951 | Gustafson | 74—473 |
| 2,951,393 | 9/1960 | Schroeder et al. | 74—473 |
| 3,323,386 | 6/1967 | Musick et al. | 74—471 |

HALL C. COE, Primary Examiner